United States Patent
Caldwell et al.

(10) Patent No.: US 9,301,155 B2
(45) Date of Patent: Mar. 29, 2016

(54) SYSTEM AND METHOD FOR MANAGING ACCESS POINT FUNCTIONALITY AND CONFIGURATION

(75) Inventors: Christopher E. Caldwell, Woodstock, GA (US); Janne P. Linkola, Espoo (FI); Omar Hassan, Kirkland, WA (US); Chris Jensen, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 1443 days.

(21) Appl. No.: 12/446,971

(22) PCT Filed: Oct. 23, 2007
(Under 37 CFR 1.47)

(86) PCT No.: PCT/US2007/082285
§ 371 (c)(1),
(2), (4) Date: Jul. 9, 2012

(87) PCT Pub. No.: WO2008/052004
PCT Pub. Date: May 2, 2008

(65) Prior Publication Data
US 2012/0317224 A1 Dec. 13, 2012

Related U.S. Application Data

(60) Provisional application No. 60/862,595, filed on Oct. 23, 2006.

(51) Int. Cl.
G06F 15/16 (2006.01)
H04W 24/00 (2009.01)
(Continued)

(52) U.S. Cl.
CPC .......... *H04W 24/00* (2013.01); *H04L 41/0816* (2013.01); *H04L 43/065* (2013.01); *H04W 16/16* (2013.01); *H04W 88/005* (2013.01); *H04W 88/06* (2013.01); *H04W 88/08* (2013.01)

(58) Field of Classification Search
None
See application file for complete search history.

(56) References Cited

U.S. PATENT DOCUMENTS

| | | |
|---|---|---|
| 4,998,271 A | 3/1991 | Tortola et al. |
| 5,513,263 A | 4/1996 | White et al. |

(Continued)

FOREIGN PATENT DOCUMENTS

| | | |
|---|---|---|
| CA | 2666472 | 8/2010 |
| EP | 1530321 A1 | 5/2005 |

(Continued)

OTHER PUBLICATIONS

European Patent Office, Supplementary European Search Report and Opinion, EP Patent Application 07854249, mailed Jun. 4, 2012, 6 pages.

(Continued)

Primary Examiner — Lisa Lewis
Assistant Examiner — Henry Tsang
(74) Attorney, Agent, or Firm — Perkins Coie LLP

(57) ABSTRACT

A system for managing access point functionally and configuration includes a server that is coupled to a computer network and configured to communicate with an access point via the computer network. The access point is configured to couple a mobile device to the computer network by providing a wireless link between the mobile device and the access point. The access point is further configured to produce a status point regarding the access point and the server is configured to receive the status report from the access point following a trigger event at the access point. In other examples, the server is further configured to transmit a response message and/or a configuration file to the access point in response to the status report that is received at the server. Other features and systems are also disclosed.

29 Claims, 7 Drawing Sheets

(51) Int. Cl.
*H04L 12/24* (2006.01)
*H04W 16/16* (2009.01)
*H04W 88/00* (2009.01)
*H04W 88/06* (2009.01)
*H04W 88/08* (2009.01)
*H04L 12/26* (2006.01)

(56) References Cited

U.S. PATENT DOCUMENTS

| | | |
|---|---|---|
| 6,493,629 B1 | 12/2002 | Van Bosch |
| 6,612,489 B2 | 9/2003 | McCormick et al. |
| 6,615,035 B1 | 9/2003 | Lucidarme et al. |
| 6,985,583 B1 | 1/2006 | Brainard et al. |
| 7,110,545 B2 | 9/2006 | Furuya et al. |
| 7,295,556 B2 | 11/2007 | Roese et al. |
| 7,346,678 B1* | 3/2008 | Zhu et al. ................ 709/224 |
| 7,353,017 B2 | 4/2008 | Chen et al. |
| 7,376,221 B1 | 5/2008 | Remy et al. |
| 7,433,673 B1 | 10/2008 | Everson et al. |
| 7,529,256 B2* | 5/2009 | Pathan ................ 370/401 |
| 7,574,207 B1* | 8/2009 | O'Neil et al. ........... 455/435.1 |
| 7,577,458 B2 | 8/2009 | Lin |
| 7,610,062 B2 | 10/2009 | Beeman et al. |
| 7,701,947 B2 | 4/2010 | Cunetto et al. |
| 7,773,579 B1 | 8/2010 | Liu et al. |
| 7,792,093 B2 | 9/2010 | Myhre et al. |
| 7,843,903 B2 | 11/2010 | Bakke et al. |
| 7,864,673 B2 | 1/2011 | Bonner |
| 8,160,614 B2 | 4/2012 | Shaffer |
| 8,320,344 B2 | 11/2012 | Hodroj et al. |
| 8,340,711 B1 | 12/2012 | Glass et al. |
| 2001/0030235 A1 | 10/2001 | Hedemann et al. |
| 2001/0052006 A1 | 12/2001 | Barker et al. |
| 2002/0147926 A1 | 10/2002 | Pecen et al. |
| 2002/0157090 A1 | 10/2002 | Anton, Jr. |
| 2002/0188581 A1 | 12/2002 | Fortin et al. |
| 2003/0119480 A1 | 6/2003 | Mohammed |
| 2004/0078708 A1 | 4/2004 | Li et al. |
| 2004/0128345 A1* | 7/2004 | Robinson et al. ........... 709/203 |
| 2004/0133689 A1* | 7/2004 | Vasisht ................ 709/228 |
| 2004/0137908 A1* | 7/2004 | Sinivaara et al. .......... 455/452.1 |
| 2004/0192299 A1 | 9/2004 | Wilson et al. |
| 2004/0203815 A1 | 10/2004 | Shoemake et al. |
| 2005/0026650 A1 | 2/2005 | Russell |
| 2005/0054342 A1 | 3/2005 | Otsuka |
| 2005/0063542 A1 | 3/2005 | Ryu |
| 2005/0078819 A1 | 4/2005 | Hsu et al. |
| 2005/0083911 A1 | 4/2005 | Grabelsky et al. |
| 2005/0086346 A1* | 4/2005 | Meyer ................ 709/229 |
| 2005/0090259 A1* | 4/2005 | Jain et al. ................ 455/439 |
| 2005/0094592 A1 | 5/2005 | Schmidt |
| 2005/0114504 A1* | 5/2005 | Marolia et al. ............. 709/224 |
| 2005/0159149 A1 | 7/2005 | Wen et al. |
| 2005/0160287 A1 | 7/2005 | Mehta et al. |
| 2005/0174992 A1 | 8/2005 | Files et al. |
| 2005/0181805 A1 | 8/2005 | Gallagher |
| 2005/0243809 A1 | 11/2005 | Best et al. |
| 2006/0068769 A1* | 3/2006 | Adya et al. ................ 455/418 |
| 2006/0075485 A1 | 4/2006 | Funahashi et al. |
| 2006/0121941 A1 | 6/2006 | Shiflett |
| 2006/0198361 A1 | 9/2006 | Chen |
| 2006/0215668 A1* | 9/2006 | Sethi et al. ................ 370/401 |
| 2006/0223498 A1 | 10/2006 | Gallagher et al. |
| 2006/0256800 A1 | 11/2006 | Harrington et al. |
| 2006/0270448 A1* | 11/2006 | Huotari et al. ............. 455/552.1 |
| 2006/0293024 A1 | 12/2006 | Benco et al. |
| 2006/0293038 A1 | 12/2006 | Walter et al. |
| 2006/0293082 A1 | 12/2006 | Neuhaus |
| 2007/0008885 A1 | 1/2007 | Bonner |
| 2007/0026862 A1 | 2/2007 | Hicks et al. |
| 2007/0049342 A1 | 3/2007 | Mayer et al. |
| 2007/0079113 A1 | 4/2007 | Kulkarni et al. |
| 2007/0115900 A1 | 5/2007 | Liang et al. |
| 2007/0123231 A1 | 5/2007 | Kim |
| 2007/0140163 A1* | 6/2007 | Meier et al. ................ 370/329 |
| 2007/0168553 A1 | 7/2007 | Jones et al. |
| 2007/0177562 A1 | 8/2007 | Castrogiovanni et al. |
| 2007/0195803 A1 | 8/2007 | Lowery et al. |
| 2008/0020773 A1 | 1/2008 | Black et al. |
| 2008/0046998 A1 | 2/2008 | Cromer et al. |
| 2008/0095086 A1 | 4/2008 | Linkola et al. |
| 2008/0151866 A1 | 6/2008 | Wu |
| 2008/0160914 A1 | 7/2008 | McRae et al. |
| 2008/0189550 A1 | 8/2008 | Roundtree |
| 2008/0219223 A1 | 9/2008 | Bienas et al. |
| 2008/0254833 A1 | 10/2008 | Keevill et al. |
| 2008/0311917 A1 | 12/2008 | Marathe et al. |
| 2009/0043876 A1 | 2/2009 | Zhang et al. |
| 2009/0074187 A1 | 3/2009 | Inoue et al. |
| 2009/0085760 A1 | 4/2009 | Lee |
| 2009/0132675 A1 | 5/2009 | Horn et al. |
| 2009/0154701 A1 | 6/2009 | Kosaraju et al. |
| 2009/0163245 A1 | 6/2009 | Oozeki |
| 2009/0215394 A1 | 8/2009 | Dewan |
| 2009/0220216 A1 | 9/2009 | Marsh et al. |
| 2009/0287922 A1 | 11/2009 | Herwono et al. |
| 2010/0014506 A1 | 1/2010 | Linkola et al. |
| 2010/0014507 A1 | 1/2010 | Linkola et al. |
| 2010/0056114 A1* | 3/2010 | Roundtree et al. ......... 455/414.1 |
| 2010/0190492 A1 | 7/2010 | Jiang |
| 2010/0235621 A1 | 9/2010 | Winkler et al. |
| 2010/0265845 A1 | 10/2010 | Lampen |
| 2011/0299686 A1 | 12/2011 | Saboff et al. |
| 2013/0083785 A1 | 4/2013 | Hodroj et al. |
| 2013/0084823 A1 | 4/2013 | Glass et al. |
| 2013/0178217 A1 | 7/2013 | Keevill et al. |

FOREIGN PATENT DOCUMENTS

| | | |
|---|---|---|
| EP | 1865656 A1 | 12/2007 |
| WO | WO-2004102941 A1 | 11/2004 |
| WO | WO-2006018047 A1 | 2/2006 |
| WO | 2006034399 A2 | 3/2006 |
| WO | WO-2006028455 | 3/2006 |
| WO | WO-2006062907 A1 | 6/2006 |
| WO | WO-2006078430 A2 | 7/2006 |
| WO | WO-2006135285 A2 | 12/2006 |
| WO | WO-2007015075 A1 | 2/2007 |
| WO | 2008013977 A2 | 1/2008 |
| WO | WO-2008036938 A2 | 3/2008 |
| WO | WO-2010099229 | 9/2010 |

OTHER PUBLICATIONS

"Wi-Fi Certified™ for Wi-Fi Protected Setup™: Easing the User Experience for Home and Small Office Wi-Fi® Networks," © 2007, 2008, 2009 Wi-Fi Alliance, 14 pages.

Belkin International, Inc., "Belkin N1 Vision Wireless Router User Manual," Jul. 11, 2007, 117 pages.

"AirStation One-Touch Secure System (AOSS)," White paper downloaded from www.buffalo-technology.com on May 27, 2009 bearing a date of Oct. 2004, Buffalo technology (USA), Inc., pp. 1-7.

"Dontronics, USB to RJ-11 VoIP Phone Adaptor," http://www.dontronics.com/phoneconnector.html, [date accessed Apr. 19, 2006], 7 pages.

"Frequently Asked Questions: Wi-Fi Protected Setup," Wi-Fi Alliance 2006, pp. 1-4.

"IVT Corporation, Bluetooth PSTN Voice AP," http://www.ivtcorporation.com/products/ap/index.php, [date accessed Apr. 19, 2006], 3 pages.

"Telco Systems: A BATM Company, Access200 Product Family Voice over IP Analog Telephone Adapters," Copyright 2005 Telco Systems, 2 pages.

"Vonage and Motorola Announce a Co-Branded Internet Telephone Adaptor with Wireless Router," PR Newswire (U.S.), Mar. 14, 2007, 2 pages.

"Wi-Fi Protected Setup," Wi-Fi Alliance 2007, http:www.wi-fi.org/wifi-protected-setup/ [Accessed on Sep. 28, 2010], 2 pages.

Bertolucci, Jeff, "Vonage's Flashy V-Portal Offers Easier VoIP Setup," PC World Communications, Apr. 1, 2008, 1 page.

(56) References Cited

OTHER PUBLICATIONS

Greene, Tim, "Vonage Tailors VoIP for Small Firms: Flat-fee Dialing Includes Local, Long-Distance Calls," Network World, Jun. 23, 2003, 2 pages.

Helander, Johannes et al., "Secure Web Services for Low-Cost Devices," Proceedings of the Eighth IEEE International Symposium on Object-Oriented Real-Time Distributed Computing (ISORC'05), May 18-20, 2005, pp. 130-139.

Honan, Mathew, "I Am Here: One Man's Experience With the Location-Aware Lifestyle," Wired Magazine: 17.2, <http://www.wired.com/gadgets/wireless/magazine/17-02/lp_guineapig?currentPage=all>, [date accessed Sep. 28, 2010], pp. 1-7.

Houghton, Mike, "Cellular Modems: 3G Access on the Move," article downloaded from www.enterpriseplanet.com on May 27, 2009 bearing a date of May 25, 2006, Enterprise IT Planet, 4 pages.

IEEE-SA Standards Board, IEEE Std. 802.11, 1999 Edition, Reaffirmed 2003, 37 pages.

International Search Report and Written Opinion for PCT/US2010/026715; filed on Mar. 9, 2010, Applicant: T-Mobile USA, Inc., Mailed on Oct. 18, 2010, 10 pages.

International Search Report and Written Opinion, International Application No. PCT/US2007/82010, filed on Oct. 19, 2007, Applicant: T-Mobile USA, Inc., Date of Mailing: Jun. 16, 2008, 10 pages.

International Search Report and Written Opinion, International Application No. PCT/US2007/82010, filed on Oct. 19, 2007, Applicant: T-Mobile USA, Inc., Date of Mailing: Jun. 18, 2008, 10 pages.

International Search Report and Written Opinion, International Application No. PCT/US2007/82285, filed on Oct. 23, 2007, Applicant: T-Mobile USA, Inc., Date of Mailing: Mar. 10, 2008, 10 pages.

International Search Report and Written Opinion, International Application No. PCT/US2009/051072, filed on Jul. 17, 2009, Applicant: T-Mobile USA, Inc., Date of Mailing: Nov. 6, 2009, 12 pages.

Lazarowitz, Elizabeth, "Easy Call: Phoning Via Web," New York Daily News, Feb. 5, 2007, New York, 3 pages.

N1 Wireless Router User Manual, Belkin International, Inc., 2007, 104 pages.

Shaw, Keith, "VoIP Invades the Home Network," Network World, Aug. 30, 2004, 1 page.

International Searching Authority, International Search Report, PCT Application PCT/US2010/025271, mailed Dec. 28, 2010, 3 pages.

International Searching Authority, Written Opinion, PCT Application PCT/US2010/025271, mailed Dec. 28, 2010, 4 pages.

European Patent Office, Extended European Search Report, EP Patent Application 07854358.4, mailed Feb. 6, 2014, 8 pages.

Nikolaidis, Apostolos E. et al. "Management Traffic in Emerging Remote Configuration Mechanisms for Residential Gateways and Home Devices," *IEEE Communications Magazine*, May 2005, pp. 154-162.

* cited by examiner

SYSTEM AND METHOD FOR MANAGING ACCESS POINT FUNCTIONALITY AND CONFIGURATION

CROSS-REFERENCE TO RELATED APPLICATION(S)

This application is a U.S. National Stage application of International Application No. PCT/US07/82285, entitled SYSTEM AND METHOD FOR MANAGING ACCESS POINT FUNCTIONALITY AND CONFIGURATION, filed Oct. 23, 2007, which claims priority to U.S. Provisional Patent Application No. 60/862,595, filed Oct. 23, 2006 each of which is hereby incorporated by reference.

BACKGROUND

In this digital age, modern telecommunication service providers and device manufacturers are increasingly relying on public and/or private IP networks, including the Internet, as a core part of their technology. For example, many telecommunications service providers now offer a suite of Voice over IP ("VoIP") services, as well as various data services, that utilize IP networks and/or IP-based wireless access networks (e.g., access networks based on IEEE 802.16 ("WiMAX"), IEEE 802.20 Mobile Broadband Wireless Access (MBWA), Ultra Wideband (UWB), 802.11 wireless fidelity ("Wi-Fi"), Bluetooth, and similar standards) for at least part of their infrastructure. Likewise, device manufacturers are producing the next generation of mobile devices (e.g. wireless handhelds, wireless handsets, mobile phones, personal digital assistances, notebook computers, and similar devices) that are enabled to send and receive information utilizing IP-based telecommunications services. In fact, many of today's modern mobile devices are able to function as "dual-mode devices" that take advantage of both cellular network technologies and IP-based technologies.

Unlicensed Mobile Access (UMA) technology has developed as part of this trend to incorporate IP solutions into mobile device telecommunication systems. UMA technology has recently been accepted into Release 6 of the 3rd Generation Partnership Project (3GPP) and is also referred to as Generic Access Network (GAN) technology. In various implementation schemes, UMA allows wireless service providers to merge cellular networks, such as Global System for Mobile Communications (GSM) networks and IP-based wireless networks into one seamless service (with one mobile device, one user interface, and a common set of network services for both voice and data). One goal of UMA is to allow subscribers to move transparently between cellular networks and IP-based wireless networks with seamless voice and data session continuity, much like they can transparently move between cells within the cellular network. Seamless in-call handover between the IP-based wireless network and the cellular network ensures that the users location and mobility do not affect the services delivered to the user.

At an operational level, UMA technology effectively creates a parallel radio access network, the UMA network, which interfaces to the mobile core network using standard mobility-enabled interfaces. For example, UMA can replace a system's GSM radio technology on the lower protocol layers with a wireless LAN, or similar technology. A call or other communication may be tunneled to the Mobile Switching Center (MSC) of a mobile service provider via an access point (e.g., a WiFi access point connected to a modem via the Internet) and gateway (e.g., a UMA network controller). In many cases, the mobile core network remains unchanged, making it much easier to maintain full service and operational transparency and allowing other aspects of the service infrastructure to remain in place. For example, in many systems that utilize UMA, the existing service provider's business support systems (BSS), service delivery systems, content services, regulatory compliance systems, and operation support systems (OSS) can support the UMA network without change. Likewise, service enhancements and technology evolution of the mobile core network apply transparently to both cellular access and UMA.

As the incorporation of IP solutions, such as UMA, into mobile device telecommunication systems expands, wireless service providers and wireless users may face various obstacles. One challenge involves properly configuring or troubleshooting access points as they are deployed or when they are operating in the field. For example, as the number of access points deployed in the field grows, a larger number of access points may need periodic servicing, including changing or updating the configuration of individual access points. Because of the larger number of access points that may need support, service support may become increasingly difficult to provide.

DETAILED DESCRIPTION

The following description provides specific details for a thorough understanding of, and enabling description for, various embodiments of the technology. One skilled in the art will understand that the technology may be practiced without these details. In some instances, well-known structures and functions have not been shown or described in detail to avoid unnecessarily obscuring the description of the embodiments of the technology. It is intended that the terminology used in the description presented below be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section.

I. Sample Network Configurations

Figure 1:
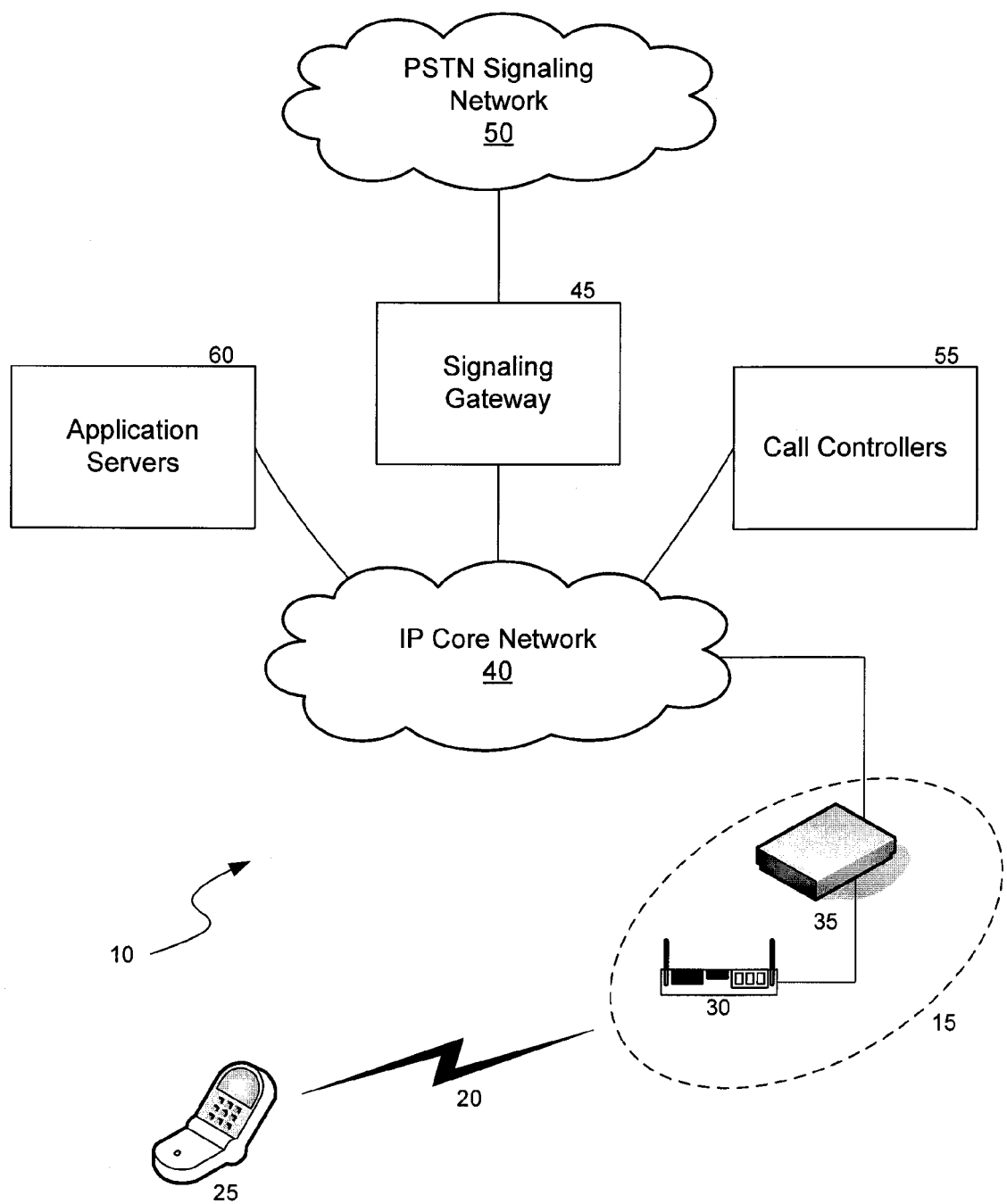
FIG. 1 illustrates aspects of a sample network system that allows VoIP-based communications in conjunction with a public switched telephone network (PSTN).
Figure 2A:
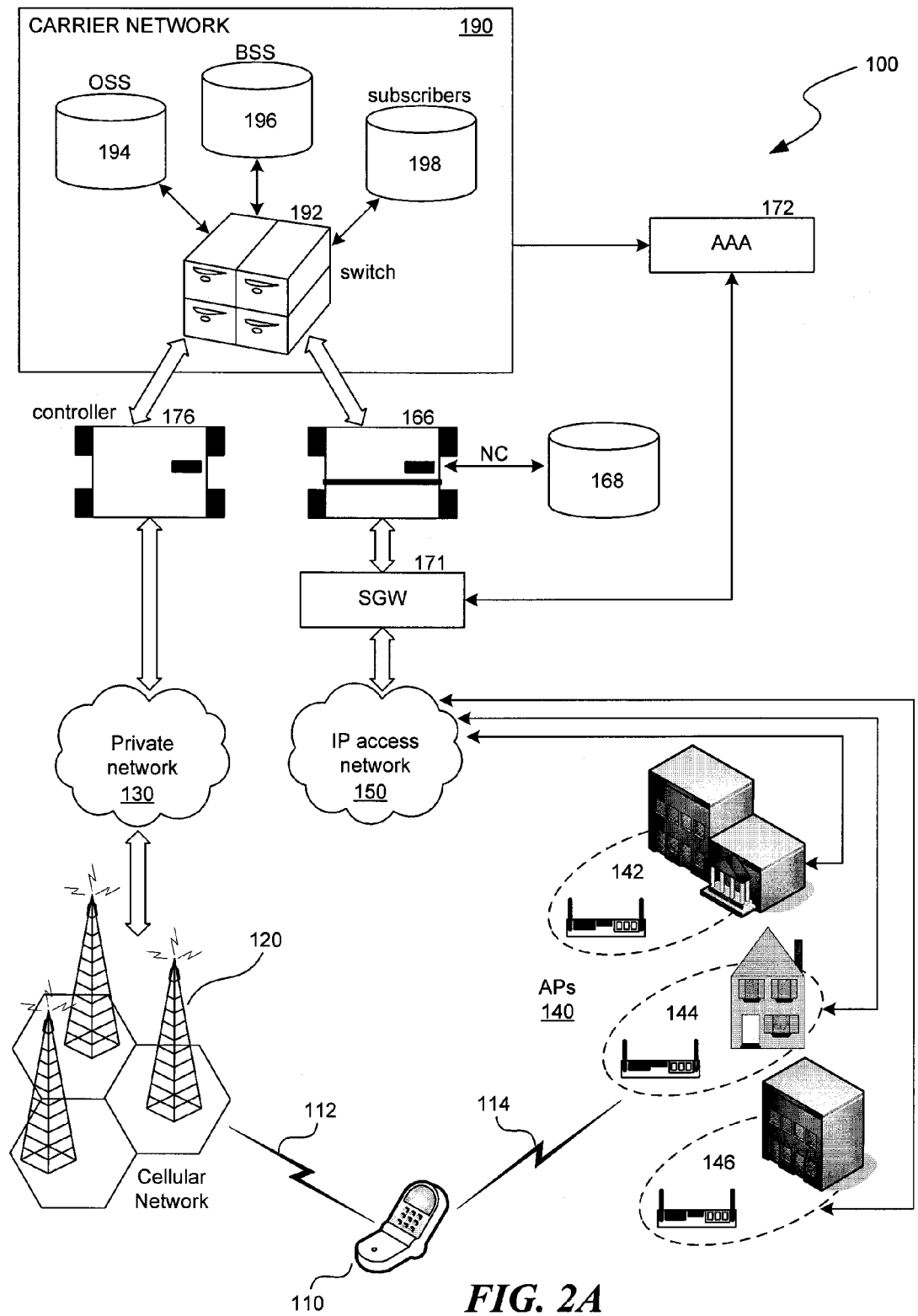
FIGS. 2A, 2B, and 3 illustrate example converged wireless network systems that combine a cellular networks with IP-based wireless telecommunications networks.
Figure 2B:
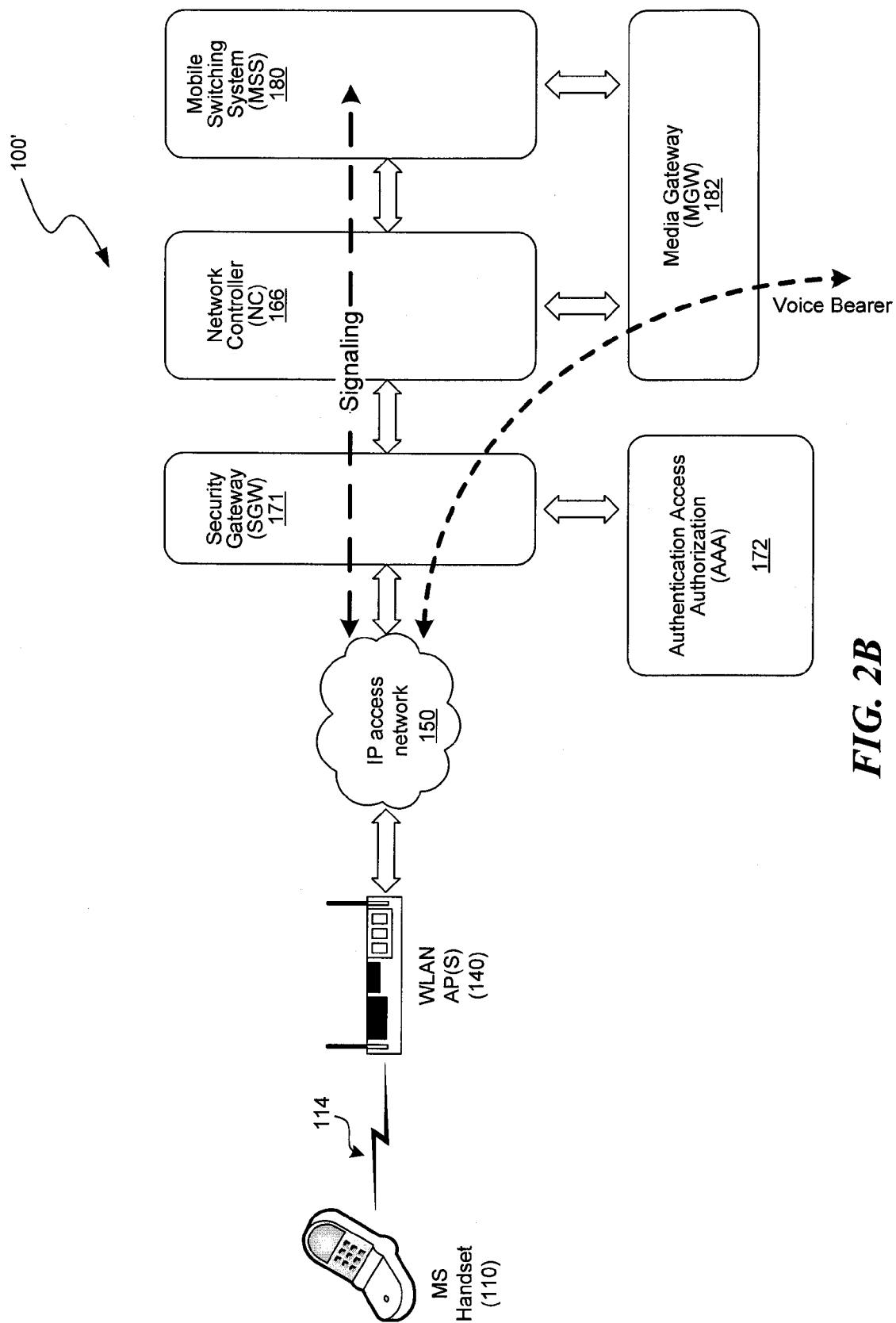
Figure 3:
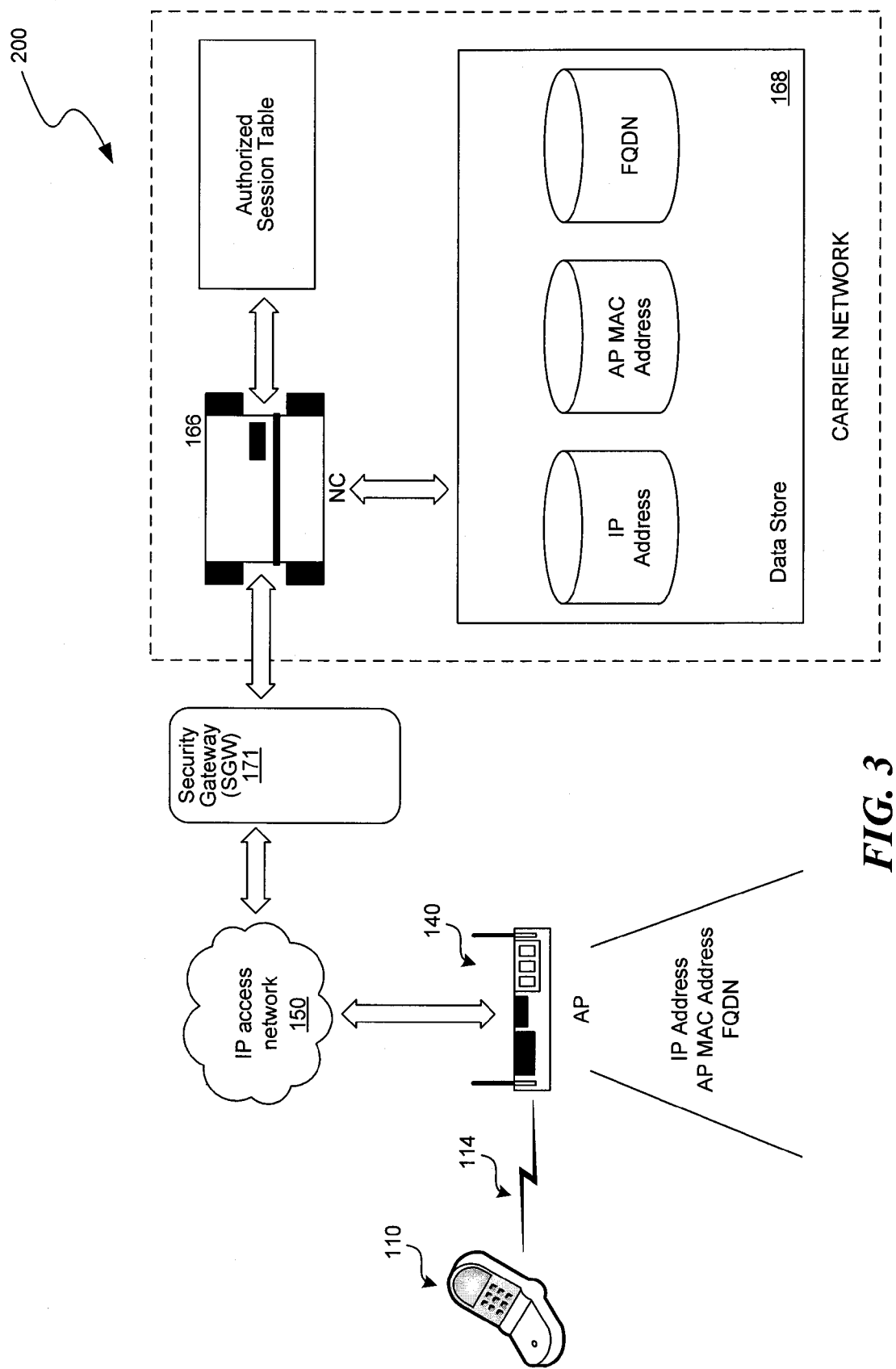

FIGS. 1-3 show sample network system configurations in which aspects of an access point can be implemented in accordance with various embodiments. In general, one aspect of the aspect point is that it can automatically produce a status report and upload a status report when it is triggered to do so. For example, such a status report can be uploaded to an upstream server, providing configuration information regarding the access point to customer support personnel. This information, in turn, can be used to manage the configuration and or functionality of the access point.

FIG. 1 illustrates aspects of a sample network system 10 that allows VoIP-based communications in conjunction with a public switched telephone network (PSTN) 50. The system 10 includes at least one wireless access point 15. The access point 15 may be public or private, and may be located, for example, in a subscribers residence (e.g., home, apartment or other residence), in a public location (e.g., coffee shops, retail stores, libraries, or schools) or in corporate or other private locations. In the sample system of FIG. 1, the access point 15 can accept communications 20 from at least one suitably configured mobile device 25 (e.g., a VoIP device). Various types of network technology may be involved in communicating between the mobile device 25 and the access point 15. While "WiFi" is used herein as an example, mobile devices and access points may employ any type of non-cellular wireless protocol, including wireless local, wide, and metropolitan area network (WLAN, WWAN, WMAN, respectively) access protocols. For example, wireless protocols can include IEEE 802.16 (WiMAX), IEEE 802.20 Mobile Broadband Wireless Access (MBWA), Ultra Wideband (UWB), 802.11 wireless fidelity (Wi-Fi), Bluetooth standards, or other similar standards. The access point 15 can include a wireless router 30 and a broadband modem 35 that enable connection to an Internet Protocol (IP) network 40 (described in more detail with respect to FIG. 3). The IP network 40 may comprise one or more public networks, private networks, or combination of public and private networks.

In a communication or set of communications 20, the access point 15 receives IP packets from the mobile device 25. These IP packets are then transported through the IP network 40 to a signaling gateway 45, which in the example of FIG. 1, is operated by a telecommunications service provider. At the signaling gateway 45, the IP packets are converted to a traditional phone service signal. The phone service signal is then conveyed to a recipient via the PSTN 50.

The network system 10 of FIG. 1 also includes a call controller 55 that provides call logic and call control functions for communications sent through the system and servers 60 for providing one or more applications or services offered by the telecommunication provider. For example, individual servers 60 include application servers that provide logic and execution of one or more applications. In accordance with many embodiments described below, the servers 60 also include one or more support servers, which allow customer support service to receive communications from the access point 15.

FIG. 2A illustrates a sample network system 100 in which aspects of the access point management can be implemented within a cellular telephone-type network. In general, with respect to the network system described in FIG. 2A, because the same cellular protocols are used in communications involving IP access points as with traditional radio towers, the cellular service provider maintains a large degree of system compatibility even though using an IP-based network. For example, the various systems of the cellular service provider that deliver content and handle mobility may not even need to be aware that a subscriber's mobile device is on an IP-based wireless telecommunications network. Instead, the various systems of the cellular service provider assume the mobile device is on its native cellular network. The IP network is, therefore, abstracted with respect to the cellular network, regardless of whether the mobile device connects to the cellular network via a base station (e.g., for licensed spectrum access) or a wireless access point (e.g., for licensed, semilicensed and/or unlicensed spectrum access—such as spectrums for IP-based telecommunications). Likewise, at a protocol level, because the same cellular protocols are used in communications involving the IP access points as with traditional radio towers, the cellular service provider maintains a large degree of system compatibility even though using an IP-based network.

Referring to FIG. 2A, a sample network system 100 combines a cellular telephone network (such as a GSM network) and an IP network 150 in a UMA-type configuration that provides service to the user of a mobile device 110. Such service may include voice services, and also supplementary services like call forwarding and call waiting, text messaging services (e.g., SMS) and data-based services like ring tone downloads, game downloads, picture messaging, email and web browsing. In addition to these services, and in particular, the network system also includes one or more support servers for receiving configuration data from one or more access points (coupled to the IP network 150). Embodiments of the support server and communication between support servers and access points are described in more detail with reference to FIGS. 4-6. Further, it will be appreciated that since the mobile device 110 is connected to an IP network, all manner of data services available over such networks may be provided to the mobile device 110.

In general, the described network system 100 accepts registration requests and communication connections from the mobile device 110. The accepted registration requests can be requests to either the cellular telephone network or to the IP-based network 150. Accordingly, to handle requests to the cellular telephone network, the cellular telephone network includes one or more cell towers 120 that are configured to accept cellular communications 112 from the mobile device 110. The cell towers 120 are connected to a base station controller 176 (such as a base station controller/radio network controller (BSC/RNC)) via a private network 130. The private network 130 can include a variety of connections (not shown) such as T1 lines, a wide area network (WAN), a local area network (LAN), various network switches, and other similar components.

The base station controller 176 controls communication traffic to a carrier core network 190, where all communications are managed (including both cellular and IP-based). Components of the carrier core network 190 in this example include a switch (e.g., a mobile switching center or MSC) 192, which is configured to control data/call flows and perform load balancing, as well as other functions. The carrier core network 190 may also include a variety of system databases such as an operation support subsystem (OSS) database 194, a business support system (BSS) database 196, and home location register (HLR) 198 or other central subscriber database that contains details of a carrier's subscribers for billing, call logging, etc.

The sample network system 100 of FIG. 2A further includes one or more access points 140 that can accept IP-based communications 114 from the mobile device 110. For example, each access point 140 can be configured as part of a wireless network in one or more locations such as a public network 142, a home network 144, or a private business network 146. Each access point 140 is coupled to the IP network 150 through, for example, a broadband connection (not shown) such as a DSL (Digital Subscriber Line) modem, a cable modem, a satellite modem, or any other broadband device.

When the mobile device 110 attempts to access the IP network 150 (i.e., to initiate an IP-based communication), information (e.g., data, voice, SMS, etc.) is initially formatted in the cellular system's native protocol and then encapsulated into Internet Protocol (IP) packets, which are transmitted to the access point 140 and routed through the IP network 150 to a security gateway 171. In contrast to non-IP communication requests, such transmissions bypass the cellular telephone system's existing network of radio towers. The security gateway 171 controls access to a network controller 166, which communicates with a data store 168 for logging and accessing communications data. Thus, one function of the network controller 166 is to manage access to the carrier network 190 when dealing with an IP-based communication (in a similar manner to that performed by the base station controller 176 for a non-IP-based communication).

In one example, authentication of a request for access by the mobile device 110 over the IP network 150 is handled by the security gateway 171, which communicates with an authentication, access and authorization (AAA) module 172 that is most likely associated with the carrier network 190. Challenges and responses to requests for access by the mobile device 110 are communicated between the HLR 198 and the AAA module 172. When authorization is granted, the security gateway 171 communicates the assignment of an IP address to the mobile device 110 that requested access. Once the security gateway 171 passes the IP address to the mobile device 110, the public IP address assigned to the mobile device 110 is passed to the network controller 166.

In another authorization example, upon receiving an identifier from the mobile device 110, the network controller 166 may query the data store 168 (see, e.g., FIG. 3) to determine if the mobile device 110 is authorized for accessing the IP network 150. Sample identifiers that may be utilized to determine access include a media access control (MAC) address associated with an access point, a mobile device or subscriber identifier (such as an International Mobile Subscriber Identifier (IMSI)), an Internet Protocol (IP) address (or "Public IP address") associated with the access point, a fully qualified domain name (FQDN), or other similar types of information. The data store 168 may be a single database, table, or list, or a combination of databases, tables, or lists, such as one for IP addresses, one of MAC addresses, and one for FQDNs. The data store 168 may include "blocked" identifiers as well as "authorized" identifiers. Authorized accesses to the IP-based wireless telecommunications network may be maintained by the network controller 166 in an authorized session table or similar data construct.

In some cases, the signaling portion of a communication (e.g., the portion of the communication that governs various overhead aspects of the communication such as, for example, when the call starts, when the call stops, initiating a telephone ring, etc.) is routed through the network controller 166 to the switch 192, while the voice bearer portion of the communication (e.g., the portion of the communication that contains the actual content (either data or voice information) of the communication) is routed through the network controller 166 to a media gateway 182 (see, e.g. FIG. 2B). In other words, the media gateway 182 controls the content flow between the service provider and the mobile device 110, while the switch 192 controls the signaling flow (or controls overhead-related flow) between the service provider and the mobile device 110.

II. Managing Access Point Functionality and Configuration

Customers of a wireless service provider often do not know much about the technology that they are using. In particular, customers who own or operate an access point do not know much about its operation and accordingly cannot give service support representatives accurate information regarding their access point. For example, a customer who is not computer literate may be unable to make necessary configuration changes to his or her access point even with the guidance of a technician. Alternatively, many computer-literate customers can make changes to their access points, but few, if any, keep records of changes they make, making it difficult for a customer to remember what has changed in order to narrow the search for the cause of an issue resulting from one of their changes. Further, an access point provider may, on occasion, wish to update the functionality of the access points it has provided. For example, a hacker may have discovered a security flaw or the provider may simply desire to release new features to access point owners. Changing access point functionality often requires the application of an update. Customers may not apply these updates due to lack of time or interest, or may not be knowledgeable enough about access points that they feel comfortable deploying an update to their access point. Either of these situations could leave a customer's access point vulnerable to hostile attacks that can cause serious problems.

In contrast to conventional access points, aspects of individual access points 15 (FIG. 1) and access point 140 (FIGS. 2A, 2B, and 3) can be managed remotely, for example, by a customer service representative. In one example, the access point can automatically produce a status report and can upload the status report to one or more servers. The servers, in turn, may be coupled to a computer associated with a customer support service, which allows a customer support representative to retrieve this data and accordingly use it to troubleshoot or configure a customers access point. As will be described in more detail below, such a status report can have other implementations.

A. Representative Access Point

In many embodiments, the access point 140 in which one or more examples of access point management may be implemented, can includes one or more CPUs (e.g., a processor), an input/output component, a wireless telecommunication component, and a memory. The CPU can coordinate communications between the input/output component, the wireless telecommunication component, and the memory. The CPU can also execute processing instructions (stored at the memory) for producing one or more status reports regarding the access point and for triggering the uploading of such a status report to a server, such as the servers 60 (FIG. 1) or other servers. For example, the memory may store a resource locator or URL corresponding to an IP address of the server. The input/output component can include, for example, one or more data ports (e.g., 8P8C Ethernet jacks, RJ11 jacks, etc.) as well as keypads and LED and/or LCD displays.

In operation, the access point 140 serves as a communication link between mobile devices connected to the wireless telecommunication component and a computer network coupled to the input/output component. In some embodiments, such a communication link includes a non-cellular (or WiFi) wireless link. In other embodiments, the communication link includes a cellular wireless link that is established at an access point (and not a cell tower). For example, the access point 140 can include an IP-enabled femtocell or other type of consumer premises equipment (CPE). The status report, accordingly, pertains to information regarding the communication link between the mobile devices and the computer network. It will be appreciated that in other examples, other components may be added to or omitted from the access point 140, and a status report may reflect such an addition or omission. For example, an access point may also be integrated with a broadband modem (see, e.g., FIG. 1) and the status report may also include information regarding network conditions downstream from the broadband modem.

B. Triggering Events

Figure 4:
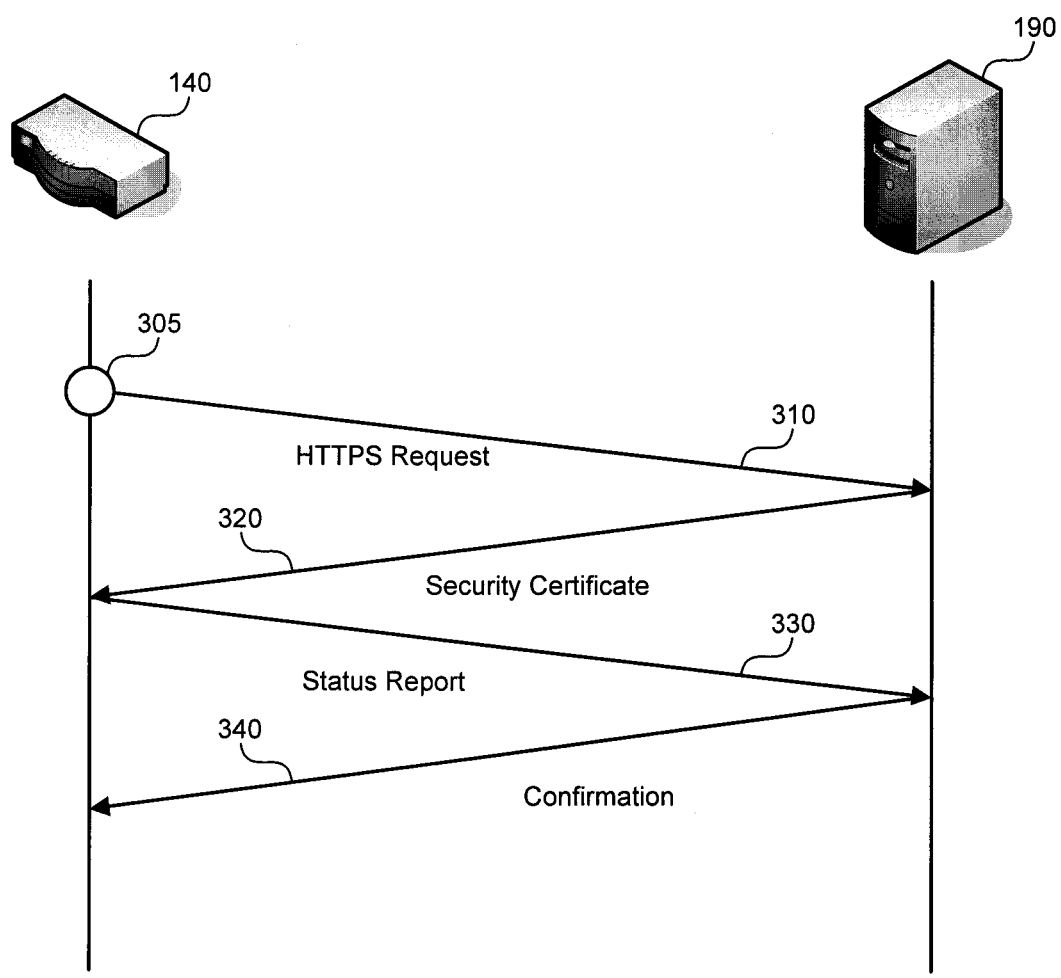
FIG. 4 is a communication diagram illustrating an example of an access point uploading configuration information to a server.

FIG. 4 is a communication diagram that illustrates the exchange of messages when the access point 140 uploads status reports to a server 190, such as the servers 60 (FIG. 1) or other servers. These status reports, for example, may be used by a service provider or customer care center to diagnose a problem with the access point, to determine whether the access point requires a configuration change, or for other reasons/uses by the service provider, manufacturer, or third party. The communication flow begins when a trigger event 305 occurs on an access point 140. The trigger event may be operator-initiated, such as when a user reboots the access point or the operator transmits/issues a command to the access point. For example, a status report may be sent to the server 190 upon rebooting the access point 140 and the access point may accordingly receive configuration data from the server 190 in response to the transmission of such a status report (e.g., in the form of a configuration file, described further with reference to FIG. 5). Further, the user may have the option to toggle whether the status report is automatically generated and transmitted upon boot-up (e.g., via the I/O component). For example, in some instances it may be preferable to not perform a "bootupdump" of such a status report every time the access point is rebooted.

Alternatively, the access point may automatically or semi-automatically initiate the upload of a status report based on the occurrence of other types of trigger events, such as when the access point detects a conflict on its communication channel, when congestion occurs at the access point, when the access point detects that a certain interval has passed since the last time it uploaded a configuration, when an alarm condition occurs, or when any other condition chosen by the access point manufacturer or service provider is satisfied. Further, under some circumstances, the service provider or someone operating on behalf of the service provider may remotely initiate the upload of a status report.

Once the trigger event 305 occurs, a secure connection is negotiated between the access point 140 and the server 190. For example, the access point 140 can retrieve the URL that is stored in the access point. The access point can accordingly use DNS to request an IP address for the server to which the URL points. If the access point obtains an IP address, it makes a request 310 of server 190 using the obtained IP address via a network protocol, such as HTTPS. If the server 190 does not respond to the request 310, the access point 140 may log this event internally and cease further processing, or it may retry the request after an arbitrary interval. In the example pictured in FIG. 4, the access point 140 is requesting a secure sockets layer (SSL) connection with the server 190, but one skilled in the art will appreciate other ways to connect to the server may be used. The server 190 receives the request and sends a response 320 that includes a server security certificate. The access point 140 confirms that the security certificate offered by the server 190 is valid and it is associated with a trusted root certificate. If confirmed, the access point 140 transmits a status report to the server in a response 330. As an additional level of security, in the response 320 the server 140 may include a request for the access point's client security certificate. If requested, the access point 140 would need to provide a security certificate that is valid in a subsequent response in order for the status report to be deemed reliable. The server 190 may validate the access point's client certificate by confirming that it is associated with a trusted root certificate, and/or by checking the certificate against a database of access point registrations to confirm that the access point 140 has authorization to communicate with the server 190.

C. Status Reports

The status report may contain information about the configuration, settings, status, and other information about the access point, including the communication link provided by the access point. For example, the status report may contain information such as the number of mobile devices that are connected to the wireless telecommunication side of an access point (including over a period of time), the number of populated/unpopulated 8P8C/RJ-11/RJ-45 jacks at the access point, the number of devices that have attempted to connect to the access point, and the number of such attempts which have been successful/unsuccessful. This information may also include connection and lease times associated with mobile devices, IP and MAC addresses of these devices, and the types of applications that have been historically run by such devices. Other information can include other access points or wireless telecommunication networks neighboring the access point, the signal strengths of these access points, the number of available channels at these access points, whether these access points (or networks) are locked, the type of stations that are connected to adjacent access points or networks, as well as the call history (i.e., to customer service) associated with these and other access points. Further, status reports can provide link or signal quality indicators associated with specific connections, intervals, etc.

Status reports may also be user-configured, for example, allowing a customer to select which type of information is contained in a status report and ultimately communicated to the server. Further, status reports may be communicated (from the server) to various other components, including the HLR.

In general, the server 190 stores the status report received from the access point in a database (not shown) so that it may be accessed in the future. The information stored in the database may include the identity of the access point providing the status report, the date and time that the status report was generated, and the contents of the status report. Below is a representative status report that may be transmitted to a server from an access point in an XML format. One skilled in the art will appreciate that the content, format, and organization of the status report could be varied significantly from that shown below without affecting the functionality described herein.

```
<?xml version="1.0" encoding="ISO-8859-1" ?>
<STATUS_REPORT xmlns:xsi=http://www.w3.org/2001/XMLSchema-instance
xsi:noNamespaceSchemaLocation="vendorname_status_report_version.xsd">
   <IDENTIFICATION>
        <RF_MAC_ADDRESS>12-34-56-AB-CD-EF</RF_MAC_ADDRESS>
        <WAN_MAC_ADDRESS>12-34-56-AB-CD-EF</WAN_MAC_ADDRESS>
        <HW_MODEL_NUMBER> T-MOBILE AP NAME</HW_MODEL_NUMBER>
        <HW_VERSION_NUMBER>A1/B1/C1/etc...</HW_VERSION_NUMBER>
<FIRMWARE_VERSION_NUMBER>4.0B6...etc</FIRMWARE_VERSION_NUMBER>
    <CERTIFICATE_ID_NUMBER>xxxxxxxxxxxx</CERTIFICATE_ID_NUMBER>
        <VENDOR_NAME>AP VENDOR PARTNER NAME</VENDOR_NAME>
</IDENTIFICATION>
<CONFIGURATION>
```

```
<WAN_SETTINGS>
    <DHCP_STATUS>ENABLED</DHCP_STATUS>
    <IP_ADDRESS>64.36.112.252</IP_ADDRESS>
<IP_SUBNET_MASK>255.255.255.0</IP_SUBNET_MASK>
<DEFAULT_GATEWAY>64.36.112.1</DEFAULT_GATEWAY>
<DNS_SERVER_PRIMARY>127.0.0.1</DNS_SERVER_PRIMARY>
            <DNS_SERVER_SECONDARY>127.0.0.1</DNS_SERVER_SECONDARY>
  </WAN_SETTINGS>
  <LAN_SETTINGS>
        <DHCP_SERVER>ENABLED</DHCP_SERVER>
        <FIREWALL_OPTIONS>ON/OFF</FIREWALL_OPTIONS>
        <NAT_SETTINGS>ON/OFF</NAT_SETTINGS>
        <BRIDGE_MODE>ON</BRIDGE_MODE>
        <PORT_FORWARDING>T237, U238, T817</PORT_FORWARDING>
  </LAN_SETTINGS>
  <WLAN_SETTINGS>
        <SSID> myhome</SSID>
        <OPERATING_MODE>AUTO</OPERATING_MODE>
<COUNTRY>ALL</COUNTRY>
<DEFAULT_CHANNEL>6</DEFAULT_CHANNEL>
<BEACON_INTERVAL>100</BEACON_INTERVAL>
<RTS_THRESHOLD>2346</RTS_THRESHOLD>
FRAGMENTATION_LENGTH>2346</FRAGMENTATION_LENGTH>
<DTIM_INTERVAL>1(1:255)</DTIM_INTERVAL>
<PREAMBLE_TYPE>LONG</PREAMBLE_TYPE>
<HIDE_NETWORK_NAME>DISABLED</HIDE_NETWORK_NAME>
<TX_POWER>100%</TX_POWER>
<ANTENNA_TYPE>PRIMARY</ANTENNA_TYPE>
<WIRELESS_RADIO>ON</WIRELESS_RADIO>
        <WIRELESS_QOS_WMM>ON</WIRELESS_QOS_WMM>
        <CTS>ON</CTS>
</WLAN_SETTINGS>
<SECURITY_SETTINGS>
    <AUTHENTICATION_TYPE>OPEN/WEP/WPA/WPA-PSK/WPA2/WPA2-
PSK</AUTHENTICATION_TYPE>
 </SECURITY_SETTINGS>
</CONFIGURATION>
<STATUS>
   <WLAN_STATUS>
   <!-- FOR EACH STATION THE FOLLOWING INFO CAN BE REQUIRED -->
        <MAC_ADDRESS>01-23-45-67-89-ab</MAC_ADDRESS>
        <CURRENT_NOISE_LEVEL>-xxdBm</CURRENT_NOISE_LEVEL>
        <POWER_SAVE_MODE>NORMAL</POWER_SAVE_MODE>
        <ASSOCIATION_MODE>11G</ASSOCIATION_MODE>
        <TRAFFIC_COUNTER>tx=123 rx=321</TRAFFIC_COUNTER>
        <DHCP_LEASE>IP_ADDRESS_MAC_ADDRESS_LEASE_TIME??</DHCP_LEASE>
        <UPTIME>???</UPTIME>
</WLAN_STATUS>
<LAN_STATUS>
       <LAN_PORT1>
           <LINK_STATUS>100</LINK_STATUS>
           <TRAFFIC_COUNTER> tx=123 rx=321</TRAFFIC_COUNTER>
       </LAN_PORT1>
       <LAN_PORT2>
           <LINK_STATUS>100</LINK_STATUS>
           <TRAFFIC_COUNTER> tx=123 rx=321</TRAFFIC_COUNTER>
       </LAN_PORT2>
       <LAN_PORT3>
           <LINK_STATUS>100</LINK_STATUS>
           <TRAFFIC_COUNTER> tx=123 rx=321</TRAFFIC_COUNTER>
       </LAN_PORT3>
       <LAN_PORT4>
           <LINK_STATUS>100</LINK_STATUS>
           <TRAFFIC_COUNTER> tx=123 rx=321</TRAFFIC_COUNTER>
       </LAN_PORT4>
 </LAN_STATUS>
  <WAN_STATUS>
       <LINK_STATUS>100</LINK_STATUS>
  </WAN_STATUS>
</STATUS>
<TEST>
       <PING_DNS_SERVER>IP_ADDRESS #PACKETS_SENT #PACKETS_RECEIVED MINIMUM
MAXIMUM AVERAGE</PING_DNS_SERVER >
       <PING_DHCP_SERVER>IP_ADDRESS #PACKETS_SENT #PACKETS_RECEIVED MINIMUM
MAXIMUM AVERAGE</PING_DHCP_SERVER>
       <PING_WAN_GATEWAY>IP_ADDRESS #PACKETS_SENT #PACKETS_RECEIVED MINIMUM
MAXIMUM AVERAGE</PING_WAN_GATEWAY >
       <PING_TMO_SERVER>IP_ADDRESS #PACKETS_SENT #PACKETS_RECEIVED MINIMUM
MAXIMUM AVERAGE</PING_TMO_SERVER >
```

```
</TEST>
 <DISABLE_STATUS_REPORT>DISABLED</DISABLE_STATUS_REPORT>
<VENDOR_EXTENDED_FEATURES>
<!--This section contains features/parameters that vendor supports and not included in the above
list -->
</VENDOR_EXTENDED_FEATURES>
</STATUS_REPORT>
```

D. Response Messages

Returning to FIG. 4, after processing the request 330, the server 190 replies to the access point with a response 340 acknowledging the receipt of the status report. The response may echo much of the information received in the status report, and otherwise acknowledge the receipt of the status report. Below is a representative response message that may be transmitted from the server to the access point in an XML format. One skilled in the art will appreciate that the content, format, and organization of the response could be varied significantly from that shown below without affecting the functionality described herein. Once the status report has been transmitted to the server and receipt confirmed, no further communication between access point and server may be needed.

```
<?xml version="1.0" encoding="ISO-8859-1"?>
<RESPONSE xmlns:xsi="http://www.w3.org/2001/XMLSchema-instance"
xsi:noNamespaceSchemaLocation="vendorname_response_version.xsd">
<IDENTIFICATION>
        <RF_MAC_ADDRESS>12-34-56-AB-CD-EF</RF_MAC_ADDRESS>
        <WAN_MAC_ADDRESS>12-34-56-AB-CD-EF</WAN_MAC_ADDRESS>
        <HW_MODEL_NUMBER> T-MOBILE AP NAME</HW_MODEL_NUMBER>
        <HW_VERSION_NUMBER>A1/B1/C1/etc...</HW_VERSION_NUMBER>
<FIRMWARE_VERSION_NUMBER>4.0B6...etc</FIRMWARE_VERSION_NUMBER>
        <CERTIFICATE_ID_NUMBER>xxxxxxxxxxxx</CERTIFICATE_ID_NUMBER>
        <VENDOR_NAME>AP VENDOR PARTNER NAME</VENDOR_NAME>
</IDENTIFICATION>
<CONFIGURATION>
    <WAN_SETTINGS>
        <DHCP_STATUS>ENABLED</DHCP_STATUS>
        <IP_ADDRESS>64.36.112.252</IP_ADDRESS>
<IP_SUBNET_MASK>255.255.255.0</IP_SUBNET_MASK>
<DEFAULT_GATEWAY>64.36.112.1</DEFAULT_GATEWAY>
        <DNS_SERVER_PRIMARY>127.0.0.1</DNS_SERVER_PRIMARY>
        <DNS_SERVER_SECONDARY>127.0.0.1</DNS_SERVER_SECONDARY>
    </WAN_SETTINGS>
    <LAN_SETTINGS>
        <DHCP_SERVER>ENABLED</DHCP_SERVER>
        <FIREWALL_OPTIONS>ON/OFF</FIREWALL_OPTIONS>
        <NAT_SETTINGS>ON/OFF</NAT_SETTINGS>
    </LAN_SETTINGS>
    <WLAN_SETTINGS>
        <SSID> myhome</SSID>
        <OPERATING_MODE>AUTO</OPERATING_MODE>
<COUNTRY>ALL</COUNTRY>
<DEFAULT_CHANNEL>6</DEFAULT_CHANNEL>
<BEACON_INTERVAL>100</BEACON_INTERVAL>
<RTS_THRESHOLD>2346</RTS_THRESHOLD>
<FRAGMENTATION_LENGTH>2346</FRAGMENTATION_LENGTH>
<DTIM_INTERVAL>1(1:255)</DTIM_INTERVAL>
<PREAMBLE_TYPE>LONG</PREAMBLE_TYPE><HIDE_NETWORK_NAME>DISABLED</HIDE_NETWORK_NAME>
<TX_POWER>100%</TX_POWER>
<ANTENNA_TYPE>PRIMARY</ANTENNA_TYPE>
<WIRELESS_RADIO>ON</WIRELESS_RADIO>
        <WIRELESS_QOS_WMM>ON</WIRELESS_QOS_WMM>
        <CTS>ON</CTS>
</WLAN_SETTINGS>
<SECURITY_SETTINGS>
        <AUTHENTICATION_TYPE>OPEN/WEP/WPA/WPA-PSK/WPA2/WPA2-
PSK</AUTHENTICATION_TYPE>
    </SECURITY_SETTINGS>
</CONFIGURATION>
<DISABLE_STATUS_REPORT>DISABLED</DISABLE_STATUS_REPORT>
<FIRMWARE_POINTER>
        https://vendorx.firmware.t-mobile.com/firmware.xml
</FIRMWARE_POINTER >
</RESPONSE>
```

E. Service Support

A service support representative can use a computer coupled to a computer network (e.g., IP network 40 (FIG. 1) and IP network 150 (FIGS. 2A, 2B and 3)) and the server 190 to retrieve and review status reports submitted by an access point. For example, the support representative may be affiliated with a customer support service provided to customers that operate the access point. Such customers could, for example, communicate with the support representative via a hotline or an online chat room. Using the status report, the customer support representative can provide up-to-date information regarding the access point. For example, the status report information may be used in individual cases to audit changes to the access point configuration over time in order to identify changes that have resulted in a customer problem. If a customer's access point requires a configuration change, the service support representative can connect to a data port of the access point to reconfigure the access point remotely. This can be accomplished either by the customer placing the access point in a remote help mode, or, in some cases, by the user rebooting the access point. For example, rebooting the access point may place the access point in remote help mode for a short period. The stored status report may also be analyzed in light of status reports from other access points, yielding aggregated data corresponding to the behavior of groups of access points. Such aggregated data could be used to identify systemic improvements that may be made to the operation of the IP-based wireless telecommunications network. For example, an automated software routine may inspect the database to identify potential or actual problems that may result in a design change, a customer contact, or the pursuit of another solution.

F. Configuration Files

Figure 5:
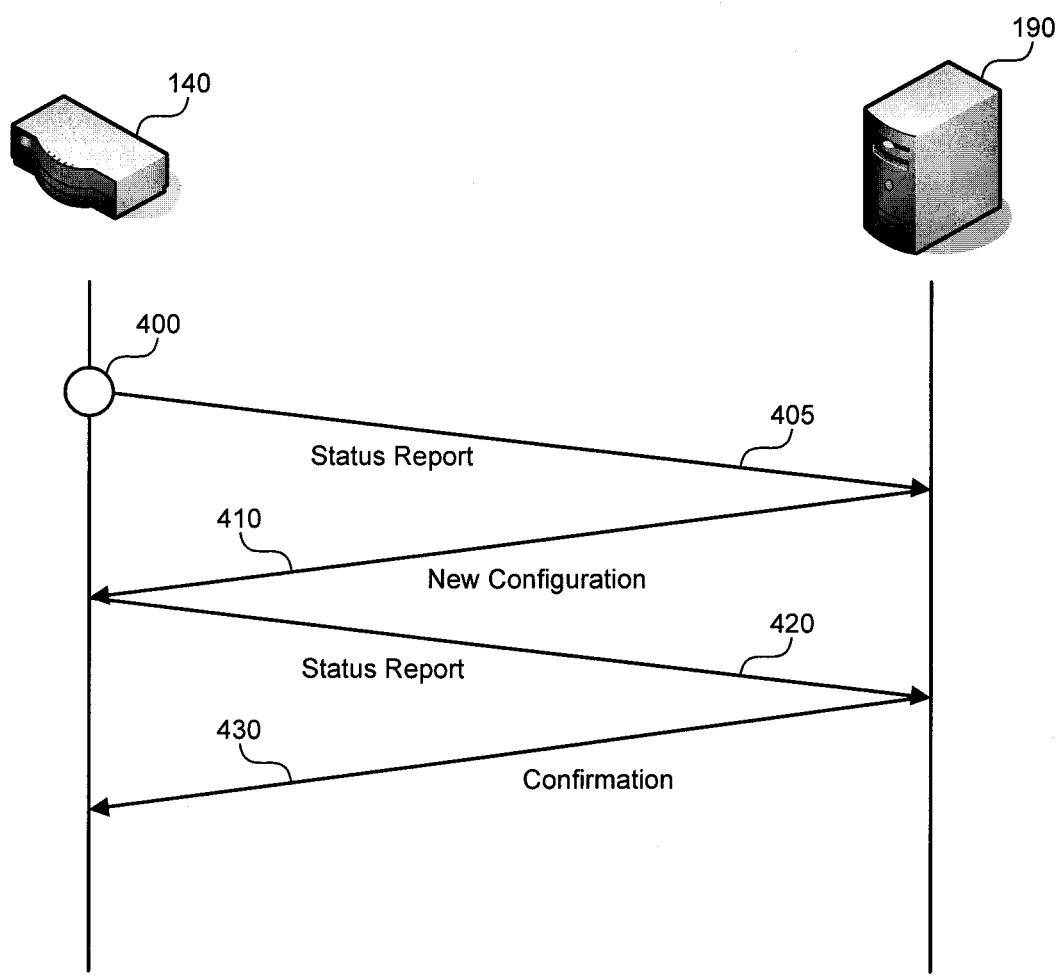
FIG. 5 is a communication diagram illustrating an example of an access point receiving a new configuration from a server.

In addition to or in lieu of a response message, a configuration file may be downloaded from the server 190 to the access point 140 in order to add new settings to the access point or to change the existing settings of the access point. FIG. 5 is a communication diagram that illustrates the exchange of messages when an access point receives a configuration file from a server. An event 400 triggers the access point 140 to open a secure network channel with the server 190 and send a communication 405 containing a status report from the access point to the server. The server analyzes the status report and determines whether an updated configuration file needs to be sent to the access point via a communication 410. Reasons for sending a configuration file include, but are not limited to, correcting an access point problem, optimizing the performance of the IP-based wireless telecommunications network, de-provisioning customers from the IP-based wireless telecommunications network, responding to a user request, or addressing other service provider, manufacturer, or third party issues. For example, the status report may indicate that a neighboring access point is causing interference or that mobile devices at the access point have conflicting IP addresses. The new configuration file contains one or more new or changed settings that are to be implemented by the access device. The configuration file may be communicated in XML-formatted text that must be accepted by the access point as legitimate. For example, access point 140 may confirm that the XML is well formed, valid, and meets other correctness criteria such as business rules or internal conventions. The access point 140 can determine whether the XML is well formed and valid using a schema that is stored at the access point and other methods known to those skilled in the art.

Once the configuration file is received by the access point 140, the access point processes the received file and applies the new or changed settings to its configuration. Adding or changing a setting may trigger the access point to reboot in order to make the settings operational. After applying the settings, the access point sends a communication 420 containing a status report with the access point's settings to the server 190. Sending a status report to the server enables the server to confirm that the settings have been correctly applied. After receiving the status report and verifying that the access point is correctly configured, the server 190 sends a confirmation message 430 to the access point. In several embodiments, the server cannot initiate the transmission of a configuration file, but can only send such a configuration file upon receiving a status report. Alternatively, in other embodiments, the server can only send a configuration file or response when directed to do so by a carrier network (e.g., via an HLR).

G. Disabling/Enabling Status Reporting

One of the settings that may be sent in a configuration file is a setting that disables the access point from sending a status report to a server when events occur that would normally have triggered the sending a status report. This change to access point behavior occurs when the setting DISABLE_STATUS_REPORT is changed to "OFF" at the access point. When the DISABLE_STATUS_REPORT setting is "OFF" an access point will send status reports to a server only when specifically requested to do so by a user or operator. The user or operator may request the access point to send a status report using a computer that is coupled to the access point 140. The disable status report setting may be particularly useful to a service provider to control the number of status reports that they receive from access points that are within the service provider's network. The service provider is able to thereby selectively determine which groups of access points need to be monitored and control the frequency of access point monitoring.

H. Firmware Upgrading

Figure 6:
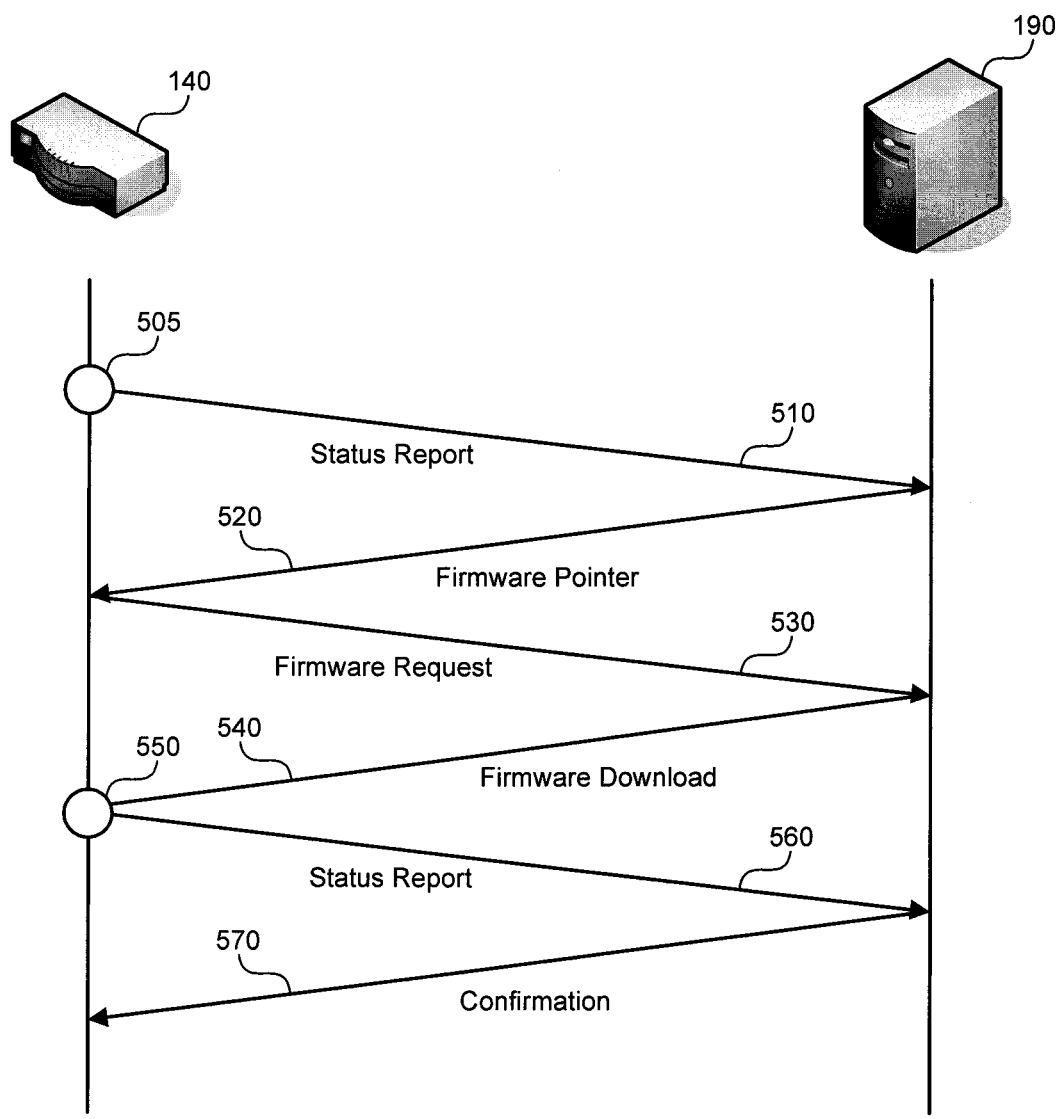
FIG. 6 is a communication diagram illustrating an example of an access point receiving a firmware update.

On a periodic basis, the firmware of the access point may need to be updated. Updating the firmware may be necessary, for example, to correct a security vulnerability, to correct or improve performance problems at an access point, to add new functionality or to change existing functionality, or to address other service provider, manufacturer, or third party issues. FIG. 6 is a communication diagram that illustrates the exchange of messages when an access point receives a firmware update from the server. The firmware update process reflected in FIG. 6 may be similar to the configuration process reflected in FIG. 5. An event 505 triggers the access point 140 to open a secure network channel with the server 190 and send a communication 510 containing a status report from the access point to the server. The status report may include the date and version of the firmware on the access point. The server 190 processes the status report and determines whether the access point requires a firmware update. If a firmware update is required, the server includes a "FIRMWARE POINTER" setting in a response 520. The access point identifies the "FIRMWARE POINTER" setting and uses the value of this setting as a URI (uniform resource identifier) to make a request 530 to obtain the firmware update from the server 190 or from another server (not shown). The server processes request 530 and responds by sending a communication 540 containing the firmware update. Upon obtaining the firmware update, the access point processes, validates, and applies the firmware update. The firmware update may optionally require the access point to reboot at an event 550 and, subsequently, reestablish a secure network channel with server 190. A status report is sent by the access point 140 to the server 190 in a communication 560. Sending a status report to the server enables the server to confirm that the new firmware has been correctly installed. After receiving the status report and verifying that the firmware is correctly installed, the server 190 sends a confirmation message 570 to the access point.

It will be appreciated that although the process described in FIG. 6 contemplates that the access point uses a web request to obtain the firmware update, one skilled in the art would appreciate that the access point could use any of a variety of network protocols to download the firmware update. Alternatively, other non-network methods may be used. As an example, request 510 might cause the service provider that manages server 190 to send the firmware update on computer readable medium to the owner of the access point. Upon receiving the computer readable medium, the owner or operator of the access point could apply the firmware update to the access point using a local personal computer.

III. Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively or additionally, network elements performing those functions could be replaced by two or more elements to perform portions of those functions. In addition, while processes, message/data flows, or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes, message/data flows, or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges. Those skilled in the art will also appreciate that the actual implementation of a database may take a variety of forms, and the term "database" is used herein in the generic sense to refer to any data structure that allows data to be stored and accessed, such as tables, linked lists, arrays, etc.

The teachings of the methods and system provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the technology can be modified, if necessary, to employ the systems, functions, and concepts of the various references described above to provide yet further embodiments of the technology.

These and other changes can be made to the invention in light of the above Detailed Description. While the above description describes certain embodiments of the technology, and describes the best mode contemplated, no matter how detailed the above appears in text, the invention can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the technology are presented below in certain claim forms, the inventors contemplate the various aspects of the technology in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the technology.

We claim:

1. A system for managing functionality and/or configuration of an access point in communication with a carrier core network, the system comprising:
   a network interface; and
   a server computer coupled to an Internet Protocol (IP)-based computer network through the network interface,
      wherein the server is configured to communicate with the access point via the IP-based computer network,
      wherein the communication includes receiving a status report from the access point,
      wherein the status report is generated at the access point following a trigger,
         wherein the status report is regarding a communication path between one or more mobile devices and a carrier core network,
         wherein the status report includes information regarding a type of application the one or more mobile devices previously used,
      wherein the carrier core network manages, at least in part, communication with the one or more mobile devices, and
      wherein the communication path includes at least a portion of the IP-based computer network.

2. The system of claim 1, wherein the server is configured to transmit a response message and/or a configuration file to the access point, the response message and/or configuration file being responsive to the status report that is received at the server.

3. The system of claim 1, further comprising one or more customer-care computers associated with the carrier core network coupled to the server via the IP-based computer network either directly or through other servers (middleware), the server being configured to transmit the status report to the one or more customer-care computers.

4. The system of claim 1, further comprising a database coupled to the server, the database including the status report communicated to the server and multiple status reports corresponding to other access points coupled to the IP-based computer network, wherein the server is configured to automatically review the status reports and improve a service provided to one or more of the access points based on the review.

5. The system of claim 1, wherein the trigger event is an operator-initiated event including at least one of rebooting the access point, providing an input at the access point, or providing an input at a computer coupled to the access point.

6. The system of claim 1, wherein the trigger event is initiated by a detection event including at least one of a conflict on a radio communication channel of the access point, a level of communication congestion at the access point, an elapsed time period associated with a previously uploaded status report, an alarm condition at the access point, and a predetermined condition chosen by a provider of the access point.

7. The system of claim 1 wherein the access point is configured for coupling the mobile devices to the IP-based computer network by providing a non-cellular wireless link between the mobile devices and the access point.

8. The system of claim 1, wherein the access point is configured for coupling the mobile devices to the IP-based computer network by providing a cellular wireless link between the mobile devices and the access point, wherein the access point is not a cell tower, and
wherein the status report further includes quality indicators for regarding the cellular wireless link for each mobile device connection to the carrier core network.

9. A computer-implemented method for operating consumer premises equipment (CPE), the method comprising:
providing a communication link between a mobile device and a carrier core network associated with the mobile device through the CPE,
wherein the communication link includes at least a portion of an Internet Protocol (IP)-based computer network, and
wherein communicating with the IP-based computer network includes encapsulating information into IP packets;
producing a status report regarding the communication link,
wherein the status report is initially generated and stored at the CPE, and
wherein the status report includes information regarding the types of applications previously run by the mobile device;
responsive to a trigger event, automatically transmitting the status report to a server,
wherein the server is coupled to the CPE via the IP-based computer network;
receiving a configuration file from the server; and
automatically changing the functionality and/or configuration of the CPE based, at least in part, on the configuration file.

10. The method of claim 9, wherein the status report includes information regarding the status of firmware installed at the CPE, and wherein changing the functionality and/or configuration of the CPE includes receiving and installing updated firmware at the CPE.

11. The method of claim 9, wherein the trigger event includes at least one of a boot-up, a power-up, or an operator-initiated signal.

12. The method of claim 9, wherein changing the functionality and/or configuration of the CPE includes at least temporarily suspending future automatic transmission of status reports from the CPE.

13. The method of claim 9, wherein changing the functionality and/or configuration of the CPE includes changing user-configurable settings remotely via the computer network.

14. The method of claim 9, wherein transmitting the status report to the server includes requesting and setting up a secure socket layer connection with the server.

15. The method of claim 9, wherein transmitting the status report to the server includes certificate based authentication to authenticate both the server and CPE before communicating the status report.

16. The method of claim 9, wherein transmitting the status report to the server includes:
retrieving a URL stored at the CPE; and
transmitting the status report to an IP address associated with the URL and corresponding to the server.

17. The method of claim 9, wherein the CPE includes an access point for establishing a cellular or non-cellular wireless link between the access point and the IP-based computer network, wherein the access point is not a cell tower.

18. An access point, comprising:
a wireless communication component;
a data port;
at least one processor; and
a memory, including:
first operating instructions executable by the processor to set up a wireless communication link between:
at least one mobile device in communication with the wireless communication component, and
a carrier core network in communication with the data port, wherein the carrier core network is associated with the at least one mobile device;
second operating instructions executable by the processor to automatically generate a status report regarding the wireless communication link, the access point, and any neighboring access points,
wherein the status report includes information regarding a type of application the at least one mobile device previously used, and
third operating instructions executable by the processor to automatically communicate the status report to a server that is coupled to the access point through an Internet Protocol (IP)-based computer network,
wherein the status report is communicated to the server in response to at least one of:
an automatic initiation at the access point,
a user initiation at the access point, or
a remote initiation via the IP-based computer network.

19. The access point of claim 18, wherein the memory further includes information corresponding to a uniform resource locator (URL) or uniform resource identifier (URI) for the server.

20. The access point of claim 18, wherein the status report includes information corresponding to firmware installed at the access point, and wherein the memory further includes fourth operating instructions executable by the processor to download and/or install updated firmware based on one or more configuration files that are returned to the access point and based on the status report.

21. The access point of claim 18, wherein the status report includes information regarding the multiple mobile devices, including a number of successful/unsuccessful connection attempts, connection and/or lease times of the mobile devices, and IP and/or MAC addresses of the mobile devices.

22. The access point of claim 18, wherein the status report includes information regarding neighboring access points, and wherein status report further includes information related to the types of devices coupled to the neighboring access points.

23. A system for changing or monitoring the configuration of an access point, the system comprising:

means for forming a wireless communication link between the access point and one or more mobiles devices;

means for receiving a status report regarding the access point at a server, the access point being coupled to the server through an Internet Protocol (IP)-based computer network, wherein the status report is in regard to the access point and the wireless communication link, wherein the status report includes information regarding a type of application the one or more mobile devices previously used; and means for:

(a) transmitting a response message and/or a configuration file to the access point, the response message and/or configuration file being based on the status report, the response message acknowledging receipt of the status report, and the configuration file corresponding to an updated configuration of the access point; or (b) transmitting the status report to one or more computers coupled to the IP-based computer network, the computers being associated with a customer support service of a carrier core network; or (c) both (a) and (b).

24. The system of claim 23, further comprising means for remotely and automatically configuring the access point based on the status report.

25. The system of claim 23, further comprising:

means for determining whether the access point requires a firmware change based on the status report; and means for automatically providing the firmware change at the access point.

26. The system of claim 23, further comprising means for initiating a triggering event at the access point, the triggering event causing the access point to transmit the status report to the server and including at least one of a request from the server to send the status report, a reboot of the access point, and placing the access point in a remote help mode.

27. A non-transitory computer-readable storage medium whose contents cause an access point to perform a method, the method comprising:

automatically generating a status report regarding the access point, wherein the status report is regarding the access point and a communication link wirelessly coupling one or more mobile devices to the access point, and wherein the status report includes information regarding a type of application the one or more mobile devices previously used; and uploading the status report to a server, via the access point and through an Internet Protocol (IP)-based communication network, wherein the access point is in communication with a carrier core network that manages, at least in part, communication associated with the one or more mobile devices, wherein the status report is uploaded responsive to a triggering event at the access point, and wherein communicating with the IP-based communication network includes encapsulating information into IP packets.

28. The computer-readable storage medium of claim 27, wherein the method further includes providing an IP-based telecommunication service to the one or more mobile devices, and wherein the call history includes customer service calls.

29. The computer-readable storage medium of claim 27, wherein the method further includes providing an unlicensed mobile access (UMA) service to the one or more mobile devices.

* * * * *